United States Patent [19]

Gray

[11] 4,203,184
[45] May 20, 1980

[54] BEARINGS

[75] Inventor: Stuart A. B. Gray, Kilmarnock, Scotland

[73] Assignee: The Glacier Metal Company Limited, Middlesex, England

[21] Appl. No.: 928,966

[22] Filed: Jul. 28, 1978

[51] Int. Cl.² ............................................. B21D 53/10
[52] U.S. Cl. ........................ 29/149.5 DP; 29/149.5 C; 29/149.5 S
[58] Field of Search ................. 29/149.5 DP, 149.5 S, 29/149.5 C

[56] References Cited

U.S. PATENT DOCUMENTS

| | | | |
|---|---|---|---|
| 2,674,782 | 4/1954 | Surtees | 29/149.5 C |
| 3,221,402 | 12/1965 | Lannen | 29/149.5 C |
| 3,317,987 | 5/1967 | Roemer | 29/149.5 C |
| 3,503,109 | 3/1970 | Krall | 29/149.5 DP |
| 3,842,473 | 10/1974 | Couper | 29/149.5 C |

FOREIGN PATENT DOCUMENTS 770228  3/1957  United Kingdom ............ 29/149.5 DP Primary Examiner—Lowell A. Larson
Assistant Examiner—V. K. Rising
Attorney, Agent, or Firm—Oblon, Fisher, Spivak, McClelland & Maier

[57] ABSTRACT

This invention is a method and apparatus for forming a partly-cylindrical bearing shell from blanks or a strip. An approximation of the final shape is achieved by feeding the strip through an arcuate passage defined by rollers, and the final shape is achieved by coin-pressing.

2 Claims, 6 Drawing Figures

BEARINGS

BACKGROUND OF THE INVENTION

Field of the Invention

This invention relates to a method of manufacturing plain bearings, for example, semi-cylindrical bearings or completely cylindrical bushes.

Such bearings or bushes may comprise a relatively thin layer or layers of softer metal or metal alloys on a single or multi layer backing, and may be formed from flat continuous stock, or from individual short blanks.

SUMMARY OF THE INVENTION

It is an object of the present invention to provide an economical method of forming truly semi-cylindrical or cylindrical plain bearings, for example, those having different metal layers of substantially constant thickness.

It is a further object to minimize deformations in the finished bearing.

It is a still further object to avoid the necessity of electroplating the final bearing layer onto the formed bearing.

According to one aspect of the invention, an apparatus for forming a cylindrical partly-cylindrical bearing comprises inner and outer forming members defining an arcuate passage for a strip of bearing material, the radially outer wall of which is defined by a series of rollers, and comprising a press disposed to receive the partly-curved strip from the two forming members and to press the strip into its finished cylindrical or partly-cylindrical shape.

Preferably, the rollers forming the outer wall of passage are free to move along a track including the arcuate passage.

The inner wall of the passage may be defined by a mandrel, for example, a roller mounted on rolling bearings, or may be defined by a series of rollers free to circulate around a generally circular track.

The depth of the passage may be adjustable for example by moving the inner wall relative to the outer wall or vice-versa or both.

In order to avoid anticlastic or transverse bowing deformation of the strip, the inner and/or outer forming member may be suitably shaped, for example the inner forming member may be generally axially convex and/or the rollers defining the outer wall of the passage may be generally axially concave.

The strip may be in the form of discrete lengths which are conveniently fed intermittently or may be in the form of a continuous strip which is continuously fed to the forming members and thereafter cut to appropriate lengths prior to pressing.

According to another aspect of the invention, a method of forming a cylindrical or partly-cylindrical bearing comprises feeding a strip of bearing material through an arcuate passage whereby the strip is formed into an approximately cylindrical shape and subsequently pressing the formed strip to a more truly cylindrical or partly cylindrical bearing.

Finished bearings are often provided with lugs whereby they may be located in position when in use. Bearings made by a method in accordance with the invention may be formed with lugs when they are pressed to their finished form.

The flat strip may have holes drilled or punched through it prior to its being fed to the the forming members so that these holes may constitute oil passages in the finished bearings.

The invention enables flat stock having a bearing lining and any necessary oil holes to be continuously formed in a two-stage process into bearings requiring little further treatment.

BRIEF DESCRIPTION OF THE DRAWINGS

Various other objects, features and attendant advantages of the present invention will be more fully appreciated as the same become better understood from the following detailed description when considered in connection with the accompanying drawings wherein like reference characters designate like or corresponding parts throughout the several views, and wherein.

DETAILED DESCRIPTION OF THE PREFERRED EMBODIMENTS

Figure 1:
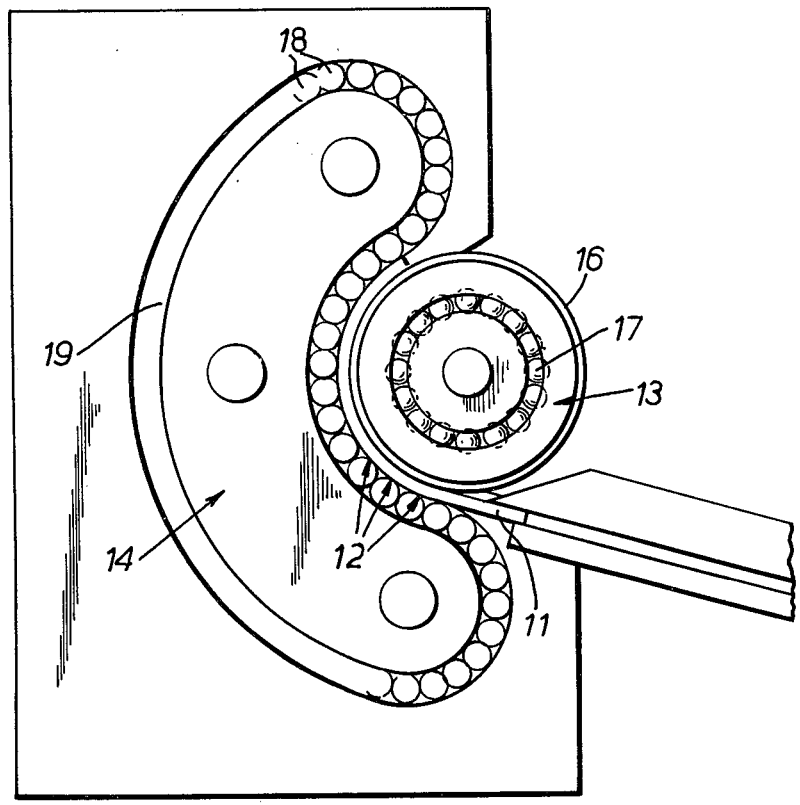
FIG. 1 is a diagrammatic sectional view through the two forming members and strip forming the first stage of shell-forming apparatus.
Figure 3:
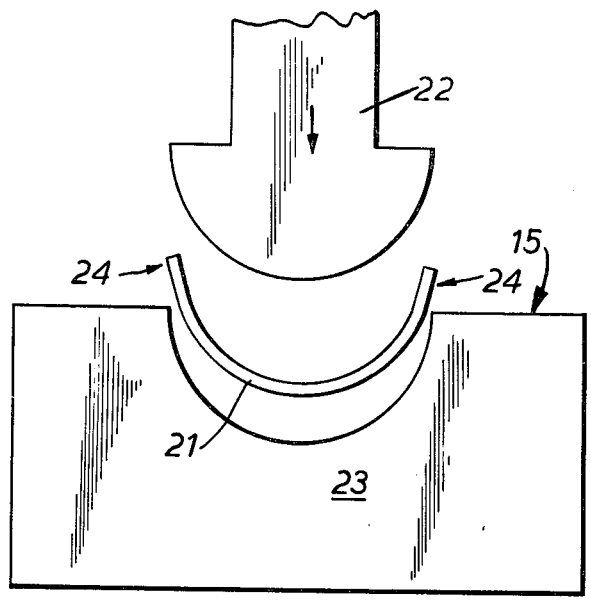
FIG. 3 shows diagrammatically a coin press forming the second stage of the forming apparatus.

The apparatus for forming a bearing comprises an inner forming member 13, an outer forming member 14 and a coining press 15 (FIGS. 1 and 3).

Figure 2A:
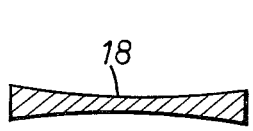
FIG. 2a is a sectional view through a roller.
Figure 2B:
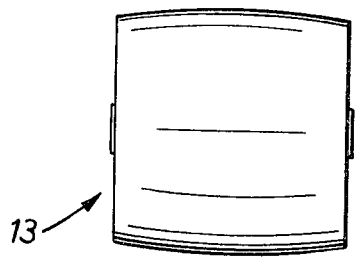
FIG. 2b is an elevation of a mandrel in the forming members of FIG. 1.

The inner forming member 13 is a freely rotatable mandrel in the form of a roller 16 mounted on rolling bearings 17. The mandrel is generally cylindrical in shape but is slightly axially convex (as shown in FIG. 2b)

The outer forming member comprises a series of relatively small rollers 18 mounted on and free to rotate about their axes, and to move along a kidney-shaped track 19, the concave part of which is defined by a rigid backing member 14 for the rollers 18. The rollers 18 are generally cylindrical in shape but are slightly axially concave (as shown in FIG. 2a).

The track shape is defined by grooves in opposed walls parallel with the plane of the figure, in which the ends of the rollers are located.

The two forming members are arranged so that the inner forming member 13 and roller 16 is concentric with the concave part of the kidney-shaped track 19, and the two are spaced apart to define an arcuate gap (shown at 12 in FIG. 1). The gap 12 is variable in depth, the adjustment being achieved through relative movement between the two forming members. It is important to have the gap 12 correctly set since too narrow a gap results in indentations in the final bearing while too wide a gap results in the finished bearing being insufficiently curved. Such adjustment also enables the apparatus to be used for forming bearings of different thickness.

During forming the blank is acted on at many points by the small rollers 18 which can both rotate and move along the track. They cannot, however, deflect under pressure because of the backing member 14.

The press 15 comprises a bend punch 22 and a coining die 23 (as shown in FIG. 3).

To form a bearing, a bearing strip in the form of a flat bearing blank 11 with a soft bearing lining on one face is fed into the arcuate gap 12 where it is progressively formed into an arcuate bearing blank 21 (as shown in FIGS. 1 and 3).

The low friction due to the rollers enables a high bending pressure to be used without damaging the blank or its lining to obtain an approximately semi-cylindrical bearing.

Figure 4:
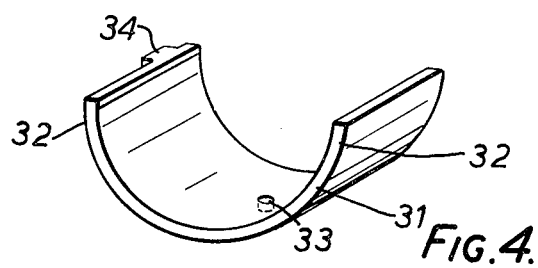
FIG. 4 shows the finished bearing.

The arcuate blank 21 tends not to conform perfectly to semi-cylindrical shape particularly at its leading and trailing ends 24 (relative to its motion through the arcuate path 12). It is therefore placed in the die 23 and pressed to its finished truly semi-cylindrical shape (shown in FIG. 4 generally at 31). The bearing 31 shown in FIG. 4 has an oil hole 33 which was drilled in or pressed from, the flat blank, and an end locating nick or projection 34 which was formed during coin pressing.

Figure 5:
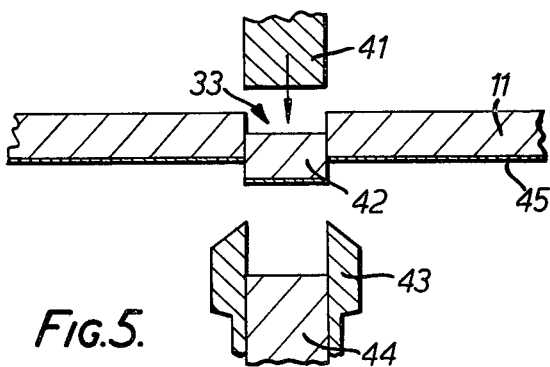
FIG. 5 shows a device for providing an oil hole in the bearing.

FIG. 5 shows as an alterantive a punch 41 for punching the oil hole 33 in the flat bearing blank 11 and lining 45 from the backing side. The slug 42 removed in forming the hole 33 is received in the hollow center of a chamfering tool 43. The chamfering tool 43 is then operated to form a chamfer on the bearing lining side of the blank 11, and the slug 42 is placed back in the hole 33 by means of a plunger 44 in the chamfering tool 43.

The blank 11 is then formed in the apparatus of FIG. 1 and the slug 42 which prevents deformation of the hole during forming is removed at the pressing stage by means of a suitably-placed protruberance 46 on the bend punch 22, and a corresponding recess 47 in the die. Thus the risk of deformation of the oil hole in the finished bearing is reduced even further by the protection afforded by the replaced slug 42.

It will be appreciated that the small deviations from semi-cylindrical shape of the blank 21 prior to pressing enables the truly semi-cylindrical bearing 31 to be obtained with a comparatively low pressing force. The advantage of this is that the feed strip 11 can be coated with a bearing lining or electro-plated prior to forming because forming hardly upsets its uniform thickness or its surface quality. This avoids the necessity for subsequent electroplating. At the same time, the low pressure pressing minimizes variations in the bearing thickness as a whole thus producing a substantially uniform bearing without the need for any subsequent machining or plating. Furthermore, the absence of deformation in the final bearing after rolling allows the bearing to be formed with a variety of features such as grooves, holes, or nicks at the blank stage without the risk of these features being distorted to any great extent. In particular, an oil hole or holes can be formed in the flat bearing blank which is considerably easier at this stage than at the formed stage due to the difficulties involved in stacking and/or positioning the formed bearings.

A further advantage the present invention has over conventional coin pressing is that bearings formed by conventional pressing frequently have a thickened portion at the 'horns' (i.e. along each longitudinal edge due to the comparatively high pressures whereas substantially no such variation in thickness or corresponding reduction in length is experienced in bearings formed by the method and apparatus of the invention in which the pressing pressures are quite low.

Obviously, numerous modifications and variations of the present invention are possible in light of the above teachings. It is therefore to be understood that within the scope of the appended claims, the invention may be practiced otherwise than as specifically described herein.

I claim:

1. A method of forming a partly-cylindrical bearing in a device utilizing a plurality of small rollers, a relatively large roller and a backing member having a kidney-shaped track formed therein which comprises:
   spacing said plurality of small rollers around said large roller so as to define an arcuate passage therebetween;
   positioning said small rollers within said track and adjacent said large roller such that said large roller is concentric with said concave portion of said kidney-shaped track;
   feeding a strip of bearing material to said arcuate passage while moving said small rollers and rotating said large roller;
   progressively deflecting said strip into an arcuate shape as said strip encounters said small rollers;
   removing from said arcuate passage a length of said formed strip; and
   pressing said formed strip to form a finished partly-cylindrical bearing.

2. The method as set forth in claim 1, which further comprises cutting said length of said formed strip into a desirable length subsequent to said step of deflecting said strip.

* * * * *